US011616461B2

(12) United States Patent
Ota et al.

(10) Patent No.: US 11,616,461 B2
(45) Date of Patent: Mar. 28, 2023

(54) MOTOR CONTROL DEVICE, MOTOR CONTROL METHOD, AND MOTOR DRIVE SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroshi Ota, Misato Saitama (JP); Hirofumi Omote, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/475,221

(22) Filed: Sep. 14, 2021

(65) Prior Publication Data
US 2022/0302863 A1    Sep. 22, 2022

(30) Foreign Application Priority Data
Mar. 17, 2021    (JP) .............................. JP2021-043872

(51) Int. Cl.
H02P 1/00        (2006.01)
H02P 3/00        (2006.01)
H02P 5/00        (2016.01)
H02P 21/22       (2016.01)
H02P 27/08       (2006.01)

(52) U.S. Cl.
CPC .............. H02P 21/22 (2016.02); H02P 27/08 (2013.01)

(58) Field of Classification Search
CPC ........................................................ H02P 21/22
USPC ........................................................ 318/139
See application file for complete search history.

(56) References Cited

U.S. PATENT DOCUMENTS

| 10,734,932 B2 | 8/2020 | Fujimori et al. |
| 2006/0197488 A1* | 9/2006 | Kamiya ............ G11B 7/08582 |
| 2007/0216335 A1* | 9/2007 | Takemori ................. H02P 8/12 |
| | | 318/685 |
| 2018/0011471 A1* | 1/2018 | Suzuki ...................... H02P 8/14 |
| 2018/0083564 A1* | 3/2018 | Sumasu ................. H02P 29/50 |

(Continued)

FOREIGN PATENT DOCUMENTS

JP    2005-160183 A    6/2005
JP    2014-158357 A    8/2014

(Continued)

Primary Examiner — Erick D Glass
(74) Attorney, Agent, or Firm — Kim & Stewart LLP

(57) ABSTRACT

A motor control device according to an embodiment comprises a first signal generator, a second signal generator, a main controller, and a driver. The first signal generator is configured to generate, based on a clock signal indicating a stepping drive cycle of a motor, a first control signal. The second signal generator is configured to generate, based on a command phase indicating a target phase of a rotor of the motor, a second control signal. The main controller is configured to control the first signal generator and the second signal generator to output at least one of the first control signal and the second control signal. The driver is configured to drive the motor based on at least one of the first control signal and the second control signal.

18 Claims, 13 Drawing Sheets

(56) References Cited

U.S. PATENT DOCUMENTS

2019/0288626 A1* 9/2019 Yamada .................. H02P 6/085
2022/0123677 A1* 4/2022 Kokubo .................. H02P 21/24

FOREIGN PATENT DOCUMENTS

| JP | 2017-131000 A | 7/2017 |
| JP | 2019-195232 A | 11/2019 |

* cited by examiner

MOTOR CONTROL DEVICE, MOTOR CONTROL METHOD, AND MOTOR DRIVE SYSTEM

CROSS-REFERENCE TO RELATED APPLICATIONS

This application is based upon and claims the benefit of priority from the prior Japanese Patent Application No. 2021-043872, filed on Mar. 17, 2021 the entire contents of which are incorporated herein by reference.

FIELD

Embodiments of the present invention relate to a motor control device, a motor control method, and a motor drive system.

BACKGROUND

A rotational angle and a rotational speed of a stepping motor can be accurately controlled based on a pulse signal. Therefore, the stepping motor is widely used in industrial fields in which high-accuracy positioning is required. Further, not only the accuracy of a rotational angle in a low-speed range and the accuracy of a rotational speed but also rotational control in a range up to a high-speed range are required.

However, an induced voltage caused by rotation of the stepping motor is proportional to a magnetic flux generated by a rotor, a current that flows in a stator, a rotational speed of the rotor, the inductance of a winding wire, and the number of magnetic poles. Therefore, when an induced voltage caused by rotation of the motor is equal to or higher than a motor power supply voltage, no more current can flow and the rotational speed of the motor does not increase.

DETAILED DESCRIPTION

Figure 1:
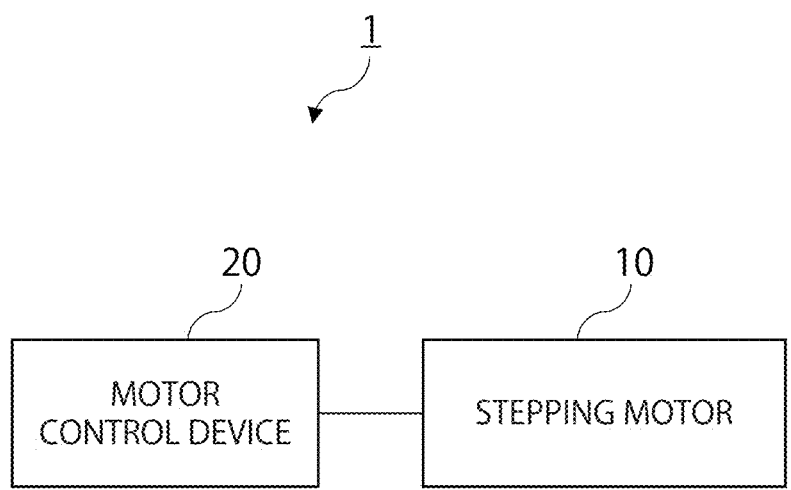
FIG. 1 is a block diagram illustrating a configuration of a motor drive system according to a first embodiment.

An embodiment of the present invention has been achieved in view of the above problems, and an object of the embodiment of the present invention is to provide a motor control device, a motor control method, and a motor drive system that can stably control torque when a rotational speed is in a range from a low-speed rotation range to a high-speed rotation range.

A motor control device according to an embodiment comprises a first signal generator, a second signal generator, a main controller, and a driver. The first signal generator is configured to generate, based on a clock signal indicating a stepping drive cycle of a motor, a first control signal including a polarity signal indicating a polarity of an excitation current that flows in the motor and a current amount signal indicating a current amount of the excitation current. The second signal generator is configured to generate, based on a command phase indicating a target phase of a rotor of the motor, a second control signal to control an excitation current that flows in the motor so as to reduce a deviation between a phase of the rotor and the target phase. The main controller is configured to control the first signal generator and the second signal generator to output at least one of the first control signal and the second control signal. The driver is configured to drive the motor based on at least one of the first control signal and the second control signal.

A motor control device, a motor control method, and a motor drive system according to embodiments of the present invention will be explained below in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

FIG. 1 is a block diagram illustrating a configuration of a motor drive system 1 according to a first embodiment. As illustrated in FIG. 1, the motor drive system 1 can execute micro-step control and vector control and includes a stepping motor 10 and a motor control device 20.

Figure 2:
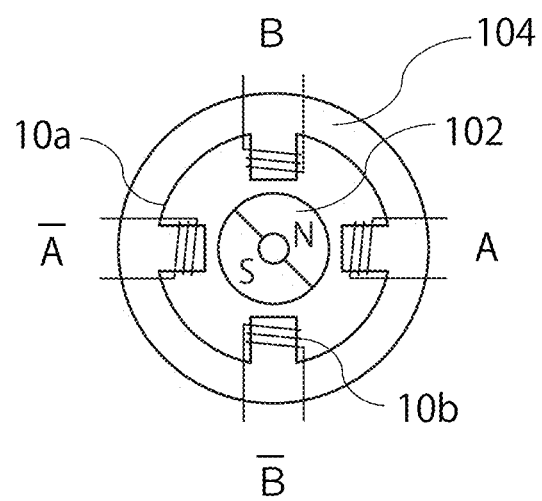
FIG. 2 is a schematic cross-sectional view of a stepping motor.

FIG. 2 is a schematic cross-sectional view of the stepping motor 10. As illustrated in FIG. 2, the stepping motor 10 is a two-phase stepping motor, for example. The stepping motor 10 according to the present embodiment is a two-phase stepping motor and is not limited thereto. For example, the stepping motor 10 may be of a PM-type, a VR-type, or a hybrid-type.

The stepping motor 10 includes, for example, a rotor 102 with a permanent magnet mounted on a rotor yoke, and a stator 104 with motor coils wound around pole teeth of a stator core. A coil A and an A bar constitute an A-phase coil 10*a* (see FIG. 4), and one end of the coil A is connected to one end of the coil A bar. A coil B and a B bar constitute a B-phase coil 10*b* (see FIG. 4), and one end of the coil B is connected to one end of the coil B bar. The A-phase coil 10*a* and the B-phase coil 10*b* with a phase difference of 90 degrees in terms of electric angle are wound around the stator 104. A predetermined motor current flows in each of the A-phase coil 10*a* and the B-phase coil 10*b* under control by the motor control device 20.

Figure 3:
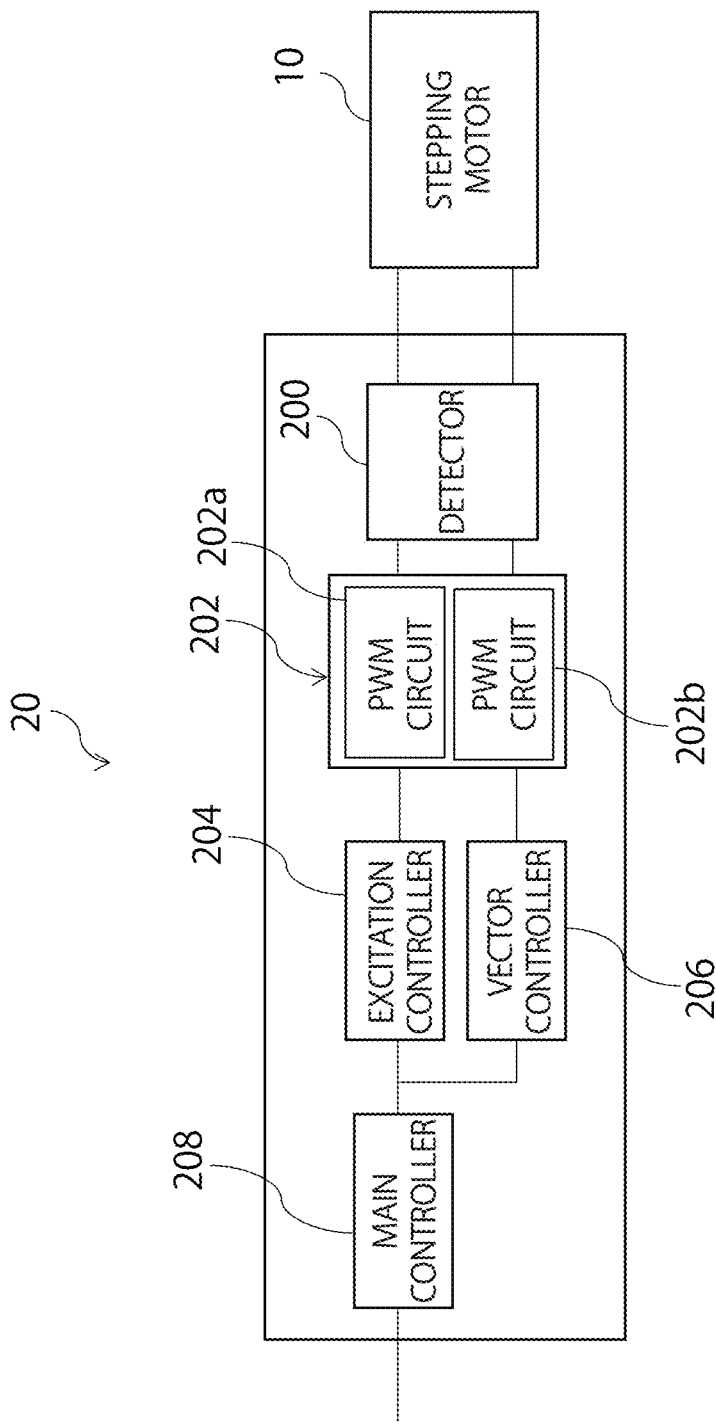
FIG. 3 is a block diagram illustrating an example of a configuration of a motor control device.

FIG. 3 is a block diagram illustrating an example of a configuration of the motor control device 20. As illustrated in FIG. 3, the motor control device 20 can execute micro-step control and vector control on the stepping motor 10. The motor control device 20 can control a motor torque current Iq and a field current Id independently, switch between the micro-step control and the vector control, and execute the micro-step control and the vector control in parallel.

The motor control device 20 includes a detector 200, a PWM circuit 202, an excitation controller 204, a vector controller 206, and a main controller 208. The PWM circuit 202 includes bridge circuits 202*a* and 202*b*. The circuit units that constitute the motor control device 20 are integrated on a semiconductor substrate. That is, the excitation controller 204, the vector controller 206, and the main controller 208 can be constituted as a circuit. The excitation controller 204 according to the present embodiment corresponds to a first signal generator, the vector controller 206 corresponds to a second signal generator, and the PWM circuit 202 corresponds to a driver.

Figure 4:
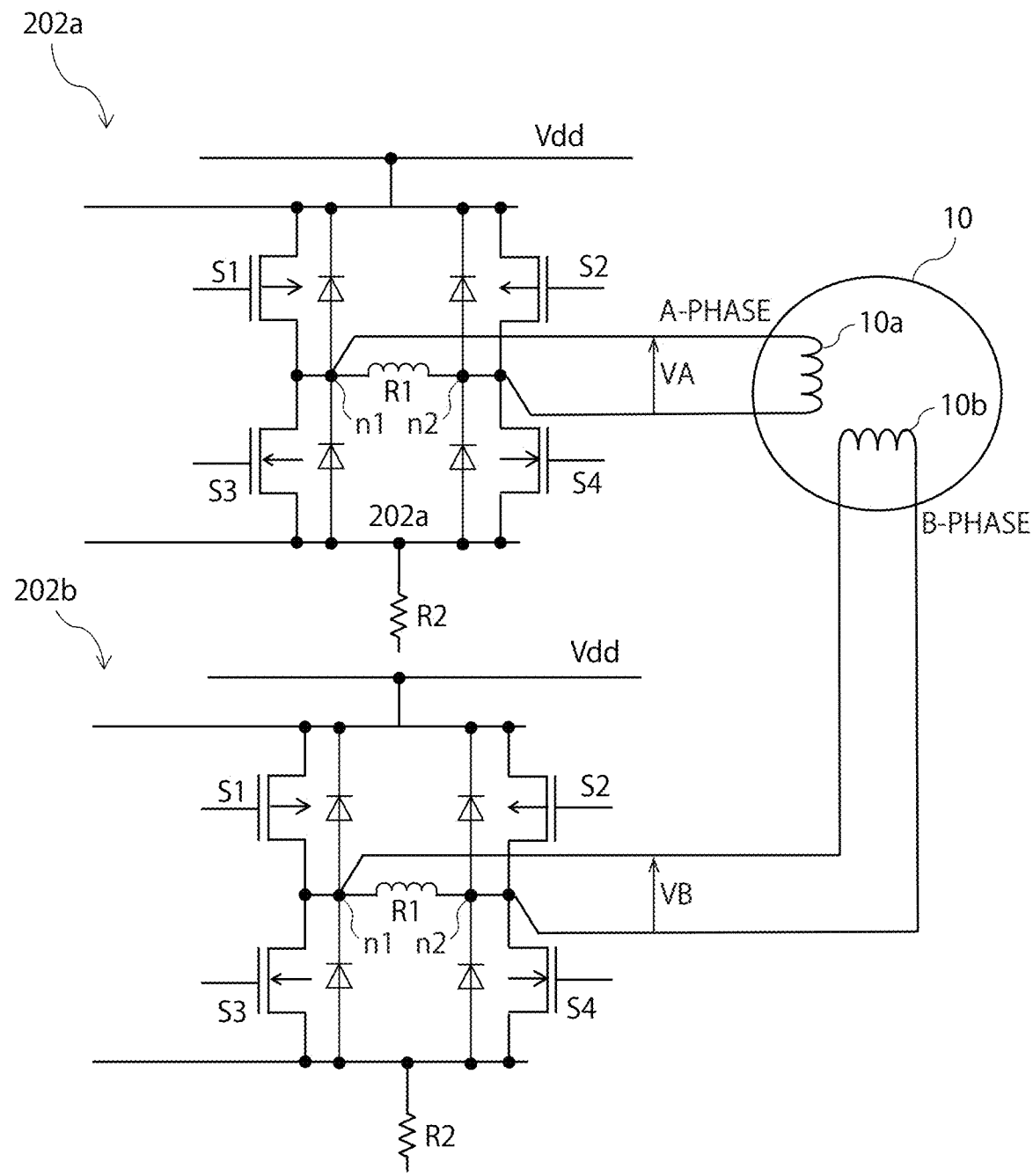
FIG. 4 is a diagram illustrating an example of a circuit configuration of a bridge circuit.

FIG. 4 is a diagram illustrating an example of a circuit configuration of the bridge circuit 202*a*. As illustrated in FIG. 4, the bridge circuit 202*a* is, for example, an H-type full-bridge circuit and includes four transistors S1 to S4. One end of the A-phase coil 10*a* is connected to a first connection point n1 of the transistors S1 and S3. The other end of the A-phase coil 10*a* is connected to a second connection point n2 of the transistors S2 and S4. A resistor R1 is connected between the first connection point n1 and the second connection point n2. Ends of the transistors S3 and S4 on the opposite side to the side on which the first and second connection points n1 and n2 are present are connected to one end of a resistor R2. The other end of the resistor R2 is grounded. Ends of the transistors S1 and S2 on the opposite side to the side on which the first and second connection points n1 and n2 are present are connected to a power supply Vdd. The bridge circuit 202*a* is switched based on a control signal of at least one of the excitation controller 204 and the vector controller 206 to switch a voltage VA between the ends of the A-phase coil 10*a*.

The bridge circuit 202*b* has the same configuration as that of the bridge circuit 202*a*. One end of the B-phase coil 10*b* is connected to a first connection point n1 of transistors S1 and S3. The other end of the B-phase coil 10*b* is connected to a second connection point n2 of transistors S2 and S4. Similarly to the bridge circuit 202*a*, the bridge circuit 202*b* is switched based on a control signal of at least one of the excitation controller 204 and the vector controller 206 to switch a voltage VB between the ends of the B-phase coil 10*b*.

A clock signal is input as a pulse to the excitation controller 204 from the main controller 208. Further, a direction command signal indicating a clockwise direction (normal rotation) or a counterclockwise direction (reverse rotation) is input to the excitation controller 204 from the main controller 208. Every time a pulse is input to the excitation controller 204, the excitation controller 204 rotates the rotor 102 of the stepping motor 10 by a predetermined angle in the direction indicated in the direction command signal. Specifically, based on the clock signal indicating a stepping drive cycle of the stepping motor 10, the excitation controller 204 supplies, to the PWM circuit 202, a first control signal including a polarity signal indicating the polarity of an excitation current that flows in the stepping motor 10 and a current amount signal indicating the amount of the excitation current. Therefore, every time a pulse is input to the excitation controller 204 from the main controller 208, the excitation controller 204 changes an excitation position in the stepping motor 10. The frequency of the pulse corresponds to a target speed. The target speed changes at a predetermined interval.

The vector controller 206 controls, based on a command phase indicating a target phase of the rotor 102 of the stepping motor 10, an excitation current that flows in the stepping motor 10 to reduce a deviation between the phase of the rotor 102 and the target phase. For example, the vector controller 206 controls a current value in a rotational coordinate system using the rotational phase of the rotor 102 of the stepping motor 10 as a reference, thereby executing the vector control on the stepping motor 10. A pulse is input to the vector controller 206 from the main controller 208. The number of pulses corresponds to the command phase. The frequency of the pulse corresponds to a target speed. The target speed changes at a predetermined interval. The vector controller 206 is described later in detail.

The main controller 208 includes elements such as a CPU, a clock circuit, and a memory circuit. The memory circuit stores therein a control program, a program that enables various types of arithmetic processing to be performed, and a parameter that is used for the arithmetic processing. The circuits and a predetermined program collaborate with each other to enable functions (described later).

The main controller 208 has a first control mode in which the micro-step control is executed, a second control mode in which the vector control is executed, and a third control mode in which the micro-step control and the vector control are executed in parallel. Information of a rotational direction, a rotational speed, a frequency, a stop position, and the like is supplied to the main controller 208 from, for example, a higher-level system. For example, the main controller 208 may switch between the control modes based on the information of the rotational speed and the like. Alternatively, the main controller 208 may switch between the control modes based on a command from the higher-level system.

The main controller 208 generates a command phase θref indicating a target phase of the rotor 102 of the motor 10 and outputs the command phase θref to the excitation controller 204 and the vector controller 206. The main controller 208 outputs a pulse signal to the excitation controller 204 and the vector controller 206, and the number of pulses corresponds to the command phase. The frequency of the pulse corresponds to a target speed. The target speed changes at a predetermined interval. The command phase θref is generated based on, for example, the target speed of the motor 10.

Figure 5:
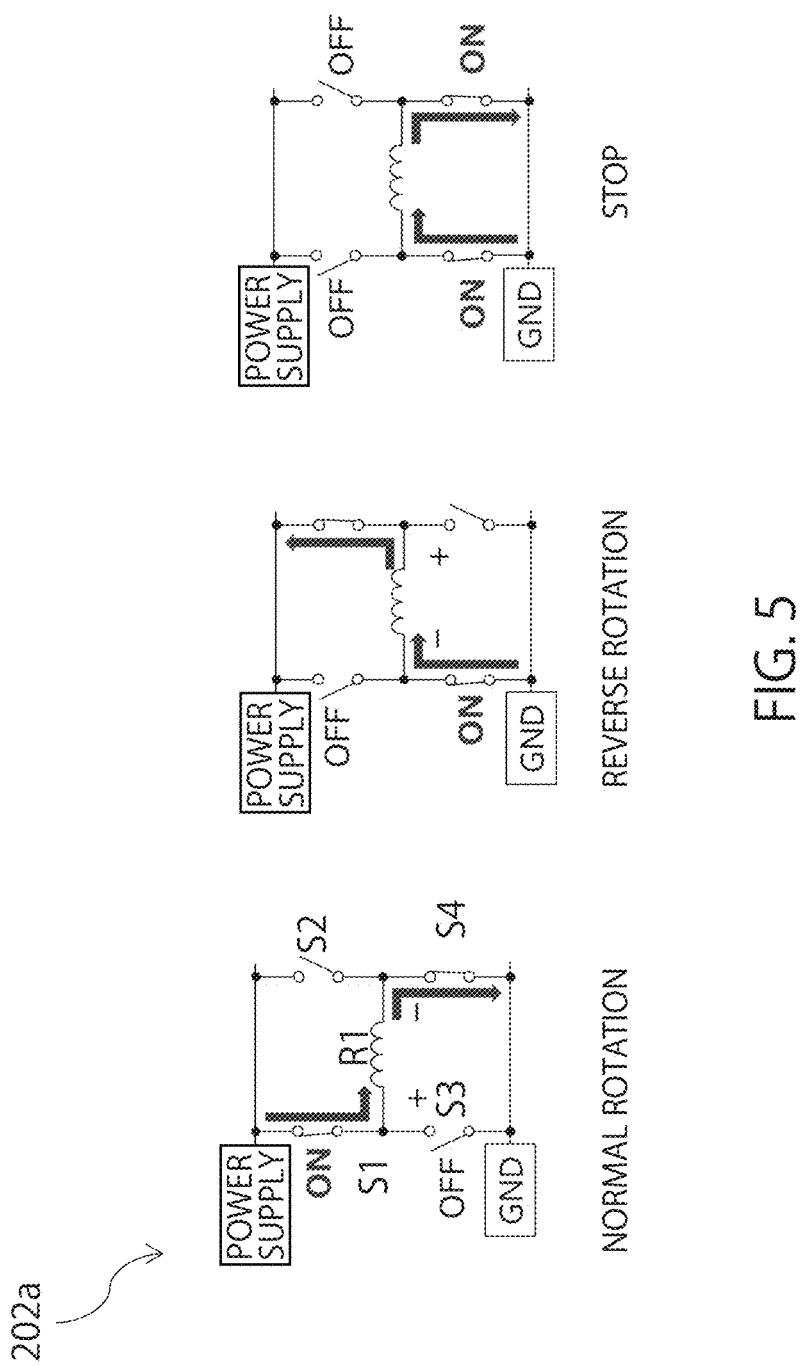
FIG. 5 is a diagram schematically illustrating an example of a switching operation of the bridge circuit.

An example in which the excitation controller 204 executes control in the first control mode is described with reference to FIGS. 5 to 8. FIG. 5 is a diagram schematically illustrating an example of a switching operation of the bridge circuit 202*a*. For example, FIG. 5 illustrates an example of an operation of switching between normal rotation, reverse rotation, and stop of the stepping motor 10. In the forward rotation, the transistors S1 and S4 are set to a conductive state to apply a positive voltage to the one end of the A-phase coil 10*a* and apply a negative voltage to the other end of the A-phase coil 10*a*. In the reverse rotation, the transistors S2 and S3 are set to a conductive state to apply a negative voltage to the one end of the A-phase coil 10*a* and apply a positive voltage to the other end of the A-phase coil 10*a*. At the stop, the transistors S3 and S4 are set to a conductive state to set the one end and the other end of the A-phase coil 10*a* to the same potential.

Referring back to FIG. 3, every time a pulse is input to the excitation controller 204 from the main controller 208, the excitation controller 204 controls the PWM controller 202 to change the magnitude and directions of excitation currents that flow in the A-phase coil 10*a* and the B-phase coil 10*b* (or the pair of coils).

Figure 6:
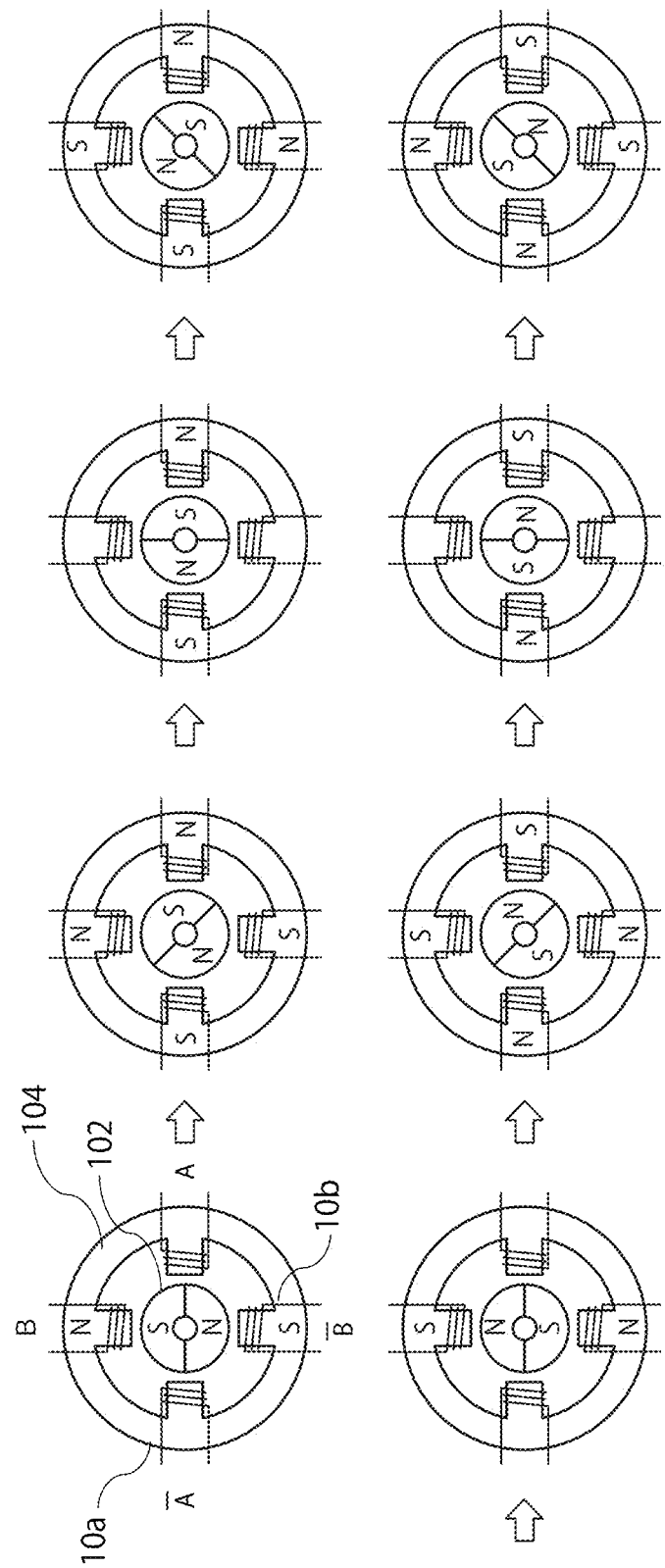
FIG. 6 is a diagram schematically illustrating an example of micro-step control by an excitation controller.

FIG. 6 is a diagram schematically illustrating an example of the micro-step control by the excitation controller 204. FIG. 6 illustrates magnetic fields and rotational angles of the A-phase coil 10*a* and the B-phase coil 10*b* in order. Specifically, FIG. 6 illustrates rotations by angles of 0, 45, 90, 135, 180, 225, 270, and 315 degrees in order from the upper left.

In the upper leftmost diagram in FIG. 6, the excitation controller 204 causes a current to flow into the B-phase coil 10*b* from the one end of the B-phase coil 10*b* and flow out of the other end of the B-phase coil 10*b* and does not cause a current to flow in the A-phase coil 10*a*. In this case, the polarity of the inside of the B-phase coil 10*b* is N and the polarity of the inside of the B bar is S. The rotor 102 is attracted by a magnetic field M0 of the B-phase coil 10*b* and stopped in a state in which the S-pole of the rotor 102 is positioned on the upper side and the N-pole of the rotor 102 is positioned on the lower side. It is assumed that when a current of the coil is I0, a magnetic field of magnitude M0 is generated.

In the upper second-leftmost diagram in FIG. 6, the excitation controller 204 generates magnetic fields and maintains the magnetic fields at the magnitude M0 to rotate the rotor 102 by 45 degrees in the clockwise direction and stop the permanent magnet at a position corresponding to the rotation by 45 degrees. The excitation controller 204 causes the B-phase coil 10*b* to generate a magnetic field of magnitude M0×sin (45 degrees)≅M0×0.707 and causes the A-phase coil 10*a* to generate a magnetic field of magnitude M0×cos (45 degrees)≅M0×0.707. That is, the excitation controller 204 causes a current to flow into the A-phase coil 10*a* from the other end of the A-phase coil 10*a* toward the one end of the A-phase coil 10*a*.

The excitation controller 204 causes the B-phase coil 10*b* to generate a magnetic field of magnitude M0×sin (0 degree) and causes the A-phase coil 10*a* to generate a magnetic field of magnitude M0×cos (0 degree)≅M0 so as to further rotate the rotor 102 by 45 degrees. That is, the excitation controller 204 does not cause a current to flow in the B-phase coil 10*b*. The excitation controller 204 causes a current to flow into the A-phase coil 10*a* from the other end of the A-phase coil 10*a* toward the one end of the A-phase coil 10*a*. The rotor 102 is attracted by the magnetic field M0 of the A-phase coil 10*a* and stopped in a state in which the S-pole of the rotor 102 is positioned on the right side and the N-pole of the rotor 102 is positioned on the left side.

As illustrated in FIG. 6, every time a pulse is input to the excitation controller 204 from the main controller 208, the excitation controller 204 rotates the stepping motor 10 by a predetermined angle or by 45 degrees in FIG. 6. The excitation controller 204 can control the stepping motor 10 to completely stop the stepping motor 10 after the rotor 102 repeatedly exceeds a stop position and returns too much with respect to the stop position. In the first control mode, the micro-step control is executed to maintain magnetic fields at a fixed magnitude, control currents that flow in the coils based on the angle to synthesize the magnetic fields, rotate the rotor 102 at any step, and stop the rotor 102.

Figure 7:
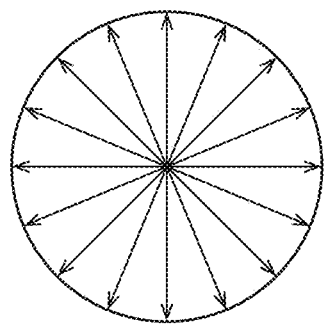
FIG. 7 is a diagram illustrating directions of magnetic fields generated by an A-phase coil and a B-phase coil.

FIG. 7 is a diagram illustrating directions of magnetic fields generated by the A-phase coil 10*a* and the B-phase coil 10*b* in the micro-step control. That is, FIG. 7 illustrates an example in which the stepping motor 10 rotates by angles of 22.5 degrees under control by the excitation controller 204.

Figure 8:
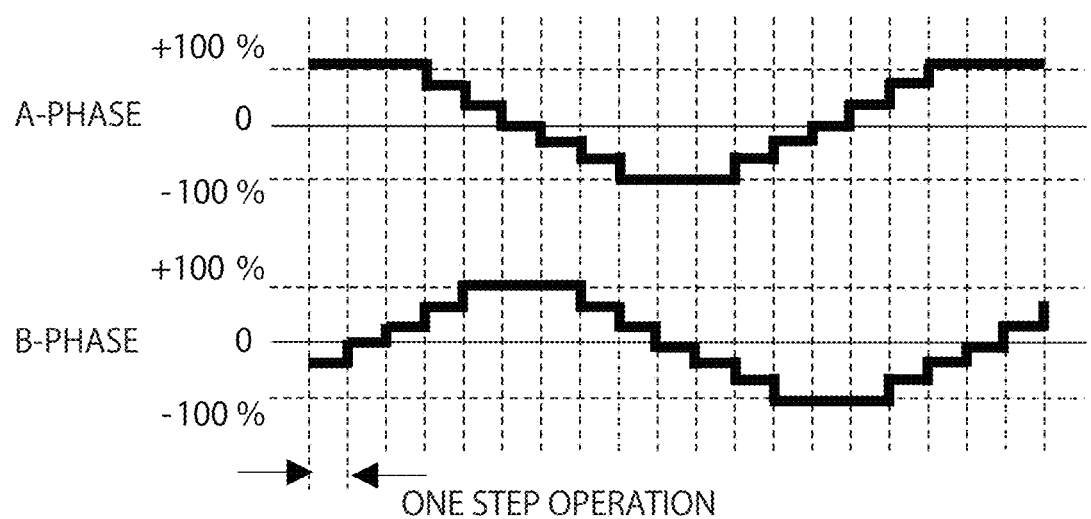
FIG. 8 is a diagram exemplifying currents that flow in the A-phase coil and the B-phase coil at each step.

FIG. 8 is a diagram exemplifying currents that flow in the A-phase coil 10*a* and the B-phase coil 10*b* at each step corresponding to each of the magnetic fields illustrated in FIG. 7. The upper chart indicates a current of the A-phase coil 10*a* and the lower chart indicates a current of the B-phase coil 10*b*. The vertical axis indicates the magnitude of a current and the horizontal axis indicates the number of steps in the micro-step control. As illustrated in FIG. 8, the excitation controller 204 controls the PWM circuit 202 at each step to control currents that flow in the A-phase coil 10*a* and the B-phase coil 10*b*. In the micro-step control by the excitation controller 204, a rotational angle is controlled based on the number of pulses and a rotational speed is controlled based on the frequency of a pulse. Further, the excitation controller 204 can rotate the rotor 102 by a small angle at one step for one pulse. In the first control mode, the excitation controller 204 rotates the rotor 102 in synchronization with an input pulse at each step. Therefore, it is possible to execute rotational control to rotate the rotor 102 by a very small angle with high accuracy.

As described above, a first control signal generated by the excitation controller 204 includes a first current amount signal indicating the magnitude and direction of a current that flows in an A layer and a second current amount signal indicating the magnitude and direction of a current that flows in a B layer. That is, the magnitude of the currents that flow in the A layer and the B layer corresponds to a current amount signal, and the directions of the currents correspond to a polarity signal.

Figure 9:
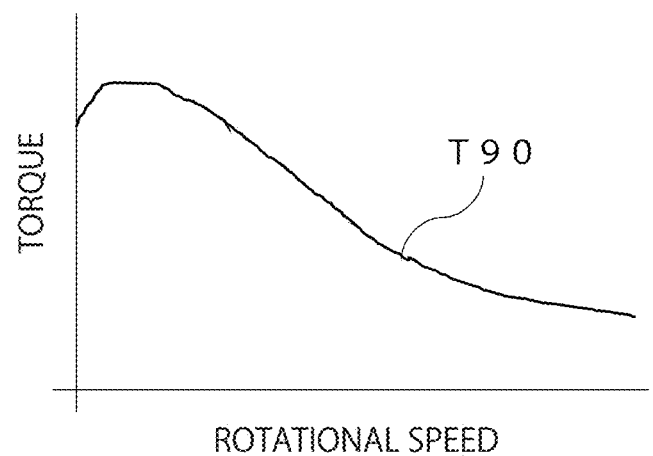
FIG. 9 is a diagram illustrating a curved line indicating a change in torque that is caused by the micro-step control.

FIG. 9 is a diagram illustrating a curved line T90 indicating a change in torque that is caused by the micro-step control. As illustrated in FIG. 9, in the micro-step control, as the rotational speed increases, torque decreases. Therefore, there is an upper limit on the rotational speed. For example, in a high-speed range, the second control mode is used. In the vector control in the second control mode, torque can be finely controlled with saved energy. As a result, the stepping motor 10 can be efficiently controlled to rotate at a speed in a range from a low speed to a high speed.

An example of a configuration of the vector controller 206 is described with reference to FIGS. 10 and 11. Although an example in which a sensor such as a rotary encoder is not provided is described in the present embodiment, the present embodiment is not limited thereto. For example, the rotational phase may be detected by a rotary encoder.

Figure 10:
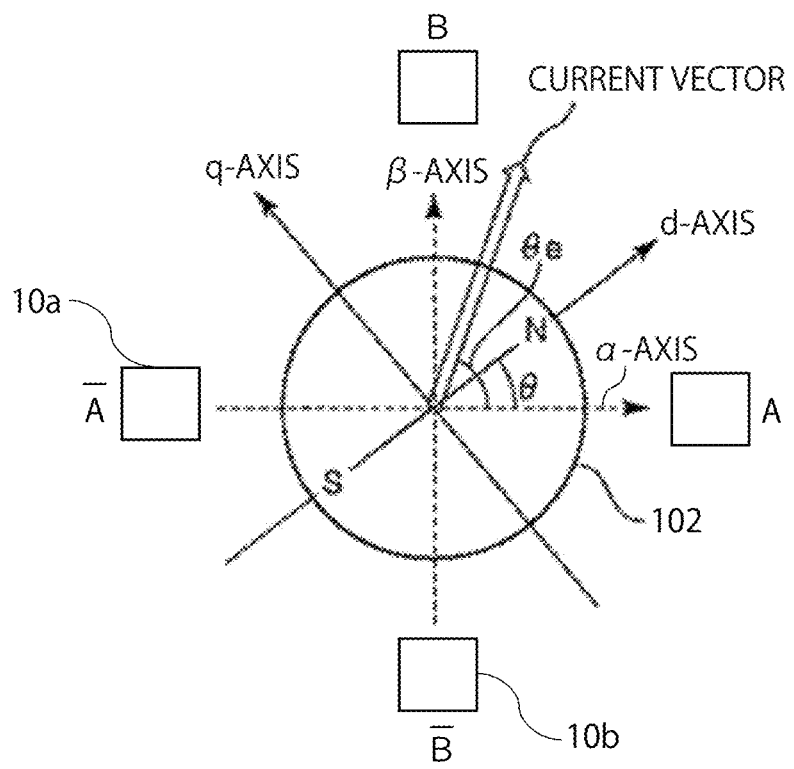
FIG. 10 is a diagram illustrating a relation between a stepping motor and a rotational coordinate system represented with a d-axis and a q-axis.

FIG. 10 is a diagram illustrating a relation between the stepping motor 10 (hereinafter referred to as "motor" in some cases) and a rotational coordinate system represented with a d-axis and a q-axis. As illustrated in FIG. 10, in a stationary coordinate system, an α-axis corresponding to the A-phase coil 10*a* and a β-axis corresponding to the B-phase coil 10*b* are defined. In FIG. 10, the d-axis is defined along the direction of a magnetic flux generated by the magnetic poles of the permanent magnet used for the rotor 102, and the q-axis is defined along a direction (a direction orthogonal to the d-axis) obtained by rotating the d-axis by 90 degrees in the counterclockwise direction. An angle formed between the α-axis and the d-axis is defined as θ, and the rotational phase of the rotor 102 is represented by the angle θ. In the vector control, the rotational coordinate system using the rotational phase of the rotor 102 as a reference is used. Specifically, in the vector control, a q-axis current Iq (a torque current component) and a d-axis current Id (an excitation current component) are used. The q-axis current Iq is a current component represented in the rotational coordinate system and included in a current vector corresponding to a drive current flowing in each of the A-phase coil 10a and the B-phase coil 10b and causes torque in the rotor 102. The d-axis current Id is affected by the strength of a magnetic flux extending through winding wires.

That is, the q-axis current Iq corresponds to a torque current that causes torque in the rotor 102 of the motor 10. The d-axis current Id corresponds to an excitation current that is affected by the strength of a magnetic flux extending through the winding wires of the motor 10. The vector controller 206 can control the q-axis current Iq and the d-axis current Id independently. As a result, the vector controller 206 controls the q-axis current based on load torque applied to the rotor 102, thereby efficiently generating torque required for rotation of the rotor 102. That is, in the vector control, the magnitude of a current vector illustrated in FIG. 10 changes based on load torque applied to the rotor 102.

Figure 11:
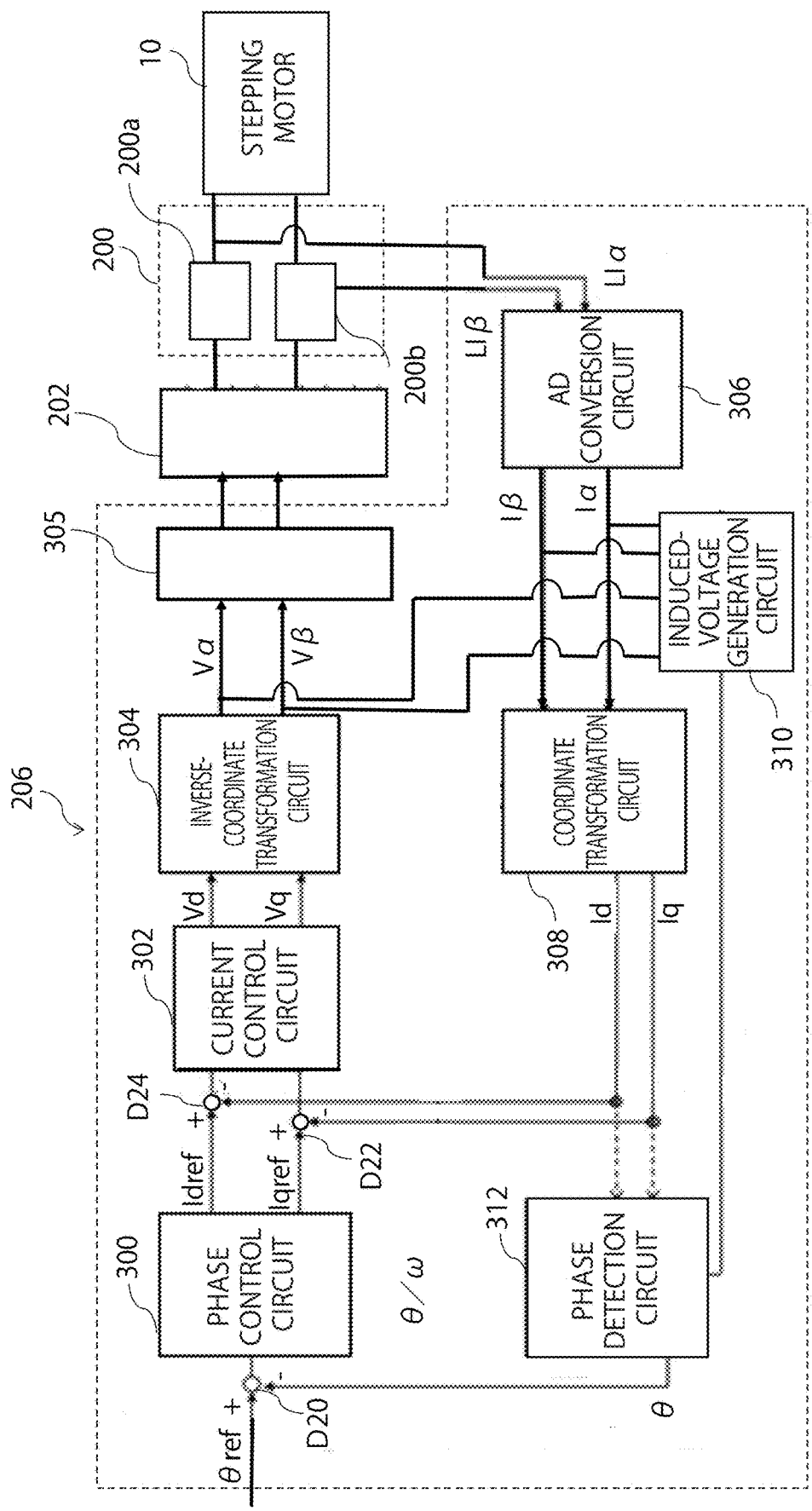
FIG. 11 is a block diagram illustrating an example of a configuration of a vector controller.

FIG. 11 is a block diagram illustrating an example of a configuration of the vector controller 206 that controls the motor 10. The vector controller 206 controls rotation of the motor 10 by executing phase feedback control to control the value of a torque current component and the value of an excitation current component so as to reduce a deviation between the command phase θref indicating the target phase of the rotor 102 and an actual rotational phase θ of the rotor 102. There is also a method of controlling a motor by executing speed feedback control to control the value of a torque current component and the value of an excitation current component so as to reduce a deviation between a command speed indicating a target speed of the rotor 102 and an actual rotational speed of the rotor 102.

As illustrated in FIG. 11, the vector controller 206 includes a phase control circuit 300, a current control circuit 302, an inverse-coordinate transformation circuit 304, a PWD control circuit 305, a coordinate transformation circuit 308, an induced-voltage generation circuit 310, a phase detection circuit 312, an arithmetic circuit 314, and subtractors D20, D22, and D24.

The vector controller 206 determines the rotational phase θ of the rotor 102 of the motor 10 by a method (described later) and executes the vector control based on the result of determination.

The subtractor D20 calculates and outputs a deviation Δθ between the rotational phase θ of the rotor 102 of the motor 10 and the command phase θref. The phase control circuit 300 acquires the deviation Δθ at an interval T. The phase control circuit 300 generates and outputs a q-axis-current command value Iqref and a d-axis-current command value Idref as target values to reduce the deviation output from the subtractor D20 based on proportional (P) control, integration (I) control, and derivative (D) control. Specifically, the phase control circuit 300 generates and outputs the q-axis-current command value Iqref and the d-axis-current command value Idref to reduce the deviation output from the subtractor D20 to 0 based on the P control, the I control, and the D control. The P control is a control method of controlling a control target value based on a value proportional to a deviation between a command value and an estimated value. The I control is a control method of controlling a control target value based on a value proportional to a value obtained by integrating a deviation between a command value and an estimated value with respect to time. The D control is a control method of controlling a control target value based on a value proportional to a change in a deviation between a command value and an estimated value over time. In the second control mode, the phase control circuit 300 controls the d-axis-current command value Idref to a value smaller than the q-axis-current command value Iqref. For example, when the rotor 102 is a permanent magnet, a current value Id that is the value of a field current is reduced to a value close to 0. Therefore, it is possible to reduce an induced voltage caused by rotation of the rotor 102 and rotate the rotor 102 at a high rotational speed.

A drive current LIα that flows in the A-phase coil 10a of the motor 10 is detected by a current detector 200a. Thereafter, the drive current LIα is converted by an AD conversion circuit 306 from an analog value to a digital value Iα. Further, a drive current LIβ that flows in the B-phase coil 10b of the motor 10 is detected by a current detector 200b. Thereafter, the drive current LIβ is converted by the AD conversion circuit 306 from an analog value to a digital value Iβ. The interval at which the current detectors 200a and 200b detects a current is equal to or shorter than the interval T at which the phase control circuit 300 acquires the deviation Δθ.

The values of the drive currents converted by the AD conversion circuit 306 from analog values to digital values are represented as current values Iα and Iβ in the stationary coordinate system according to Equations (1) and (2) using a phase θe of the current vector illustrated in FIG. 10. The phase θe of the current vector is an angle formed between the α-axis and the current vector, and I is the magnitude of the current vector.

$$I\alpha = I \times \cos \theta e \quad (1)$$

$$I\beta = I \times \sin \theta e \quad (2)$$

The current values Iα and Iβ are input to the coordinate transformation circuit 308 and the induced-voltage generation circuit 310.

The coordinate transformation circuit 308 transforms the current values Iα and Iβ in the stationary coordinate system into a current value Iq of a q-axis current and a current value Id of a d-axis current in the rotational coordinate system according to Equations (3) and (4).

$$Id = \cos \theta \times I\alpha + \sin \theta \times I\beta \quad (3)$$

$$Iq = -\sin \theta \times I\alpha + \cos \theta \times I\beta \quad (4)$$

The q-axis-current command value Iqref output from the phase control circuit 300 is input to the subtractor D22. Further, the current value Iq output from the coordinate transformation circuit 308 is input to the subtractor D22. The subtractor D22 calculates a deviation between the q-axis-current command value Iqref and the current value Iq and outputs the deviation to the current control circuit 302.

The d-axis-current command value Idref output from the phase control circuit 300 is input to the subtractor D24. Further, the current value Id output from the coordinate transformation circuit 308 is input to the subtractor D24. The subtractor D24 calculates a deviation between the d-axis-current command value Idref and the current value Id and outputs the deviation to the current control circuit 302.

The current control circuit 302 generates, based on PID control, a drive voltage Vq to reduce the deviation output from the subtractor D22. Specifically, the current control circuit 302 generates the drive voltage Vq to reduce the deviation output from the subtractor D22 to 0 and outputs the drive voltage Vq to the inverse-coordinate transformation circuit 304.

Similarly, the current control circuit 302 generates, based on PID control, a drive voltage Vd to reduce the deviation output from the subtractor D24. Specifically, the current control circuit 302 generates the drive voltage Vd to reduce the deviation output from the subtractor D24 to 0 and outputs the drive voltage Vd to the inverse-coordinate transformation circuit 304.

The inverse-coordinate transformation circuit 304 inversely transforms the drive voltages Vq and Vd output from the current control circuit 302 in the rotational coordinate system into drive voltages Vα and Vβ in the stationary coordinate system according to Equations (5) and (6).

$$V\alpha = \cos\theta \times Vd - \sin\theta \times Vq \quad (5)$$

$$V\beta = \sin\theta \times Vd + \cos\theta \times Vq \quad (6)$$

The inverse-coordinate transformation circuit 304 outputs the inversely transformed drive voltages Vα and Vβ to the PWD control circuit 305 and the induced-voltage generation circuit 310.

The PWD control circuit 305 generates a PWM signal based on the drive voltages Vα and Vβ input from the inverse-coordinate transformation circuit 304 and supplies the PWM signal to the PWM circuit 202. The PWM circuit 202 generates drive currents Iα and Iβ based on the drive voltages Vα and Vβ and supplies the drive currents Iα and Iβ to the winding wires of the phase coils of the motor 10, thereby driving the motor 10. In the present embodiment, the PWM inverter includes the full-bridge circuits and may be a half-bridge circuit or the like.

Next, a configuration for determining the rotational phase θ is described. In order to determine the rotational phase θ of the rotor 102, values of voltages Eα and Eβ induced in the A-phase coil 10a and the B-phase coil 10b of the motor 10 by rotation of the rotor 102 are used.

The induced-voltage generation circuit 310 generates the values of the induced voltages. Specifically, the induced-voltage generation circuit 310 generates the induced voltages Eα and Eβ using the current values Iα and Iβ input to the induced-voltage generation circuit 310 from the AD conversion circuit 306 and the drive voltages Vα and Vβ input to the induced-voltage generation circuit 310 from the inverse-coordinate transformation circuit 304 according to Equations (7) and (8).

$$E\alpha = V\alpha - R \times I\alpha - L \times dI\alpha/dt \quad (7)$$

$$E\beta = V\beta - R \times I\beta - L \times dI\beta/dt \quad (8)$$

In these equations, R is a resistance of each of the winding wires, and L is an inductance of each of the winding wires. The value of the resistance of each of the winding wires and the value of the inductance of each of the winding wires are values specific to the motor 10 used. The induced voltages Eα and Eβ determined by the induced-voltage generation circuit 310 are output to the phase detection circuit 312.

The phase detection circuit 312 determines the rotational phase θ of the rotor 102 of the motor 10 based on the ratio of the induced voltage Eβ output from the induced-voltage generation circuit 310 to the induced voltage Eα output from the induced-voltage generation circuit 310 according to the following Equation (9). As described above, the rotational phase θ of the rotor 102 is supplied to the subtractor D20.

$$\theta = \tan^{-1}(-E\beta/E\alpha) \quad (9)$$

When the vector controller 206 executes the vector control, the vector controller 206 repeatedly executes the foregoing control. The vector controller 206 executes the vector control using phase feedback control to control current values in the rotational coordinate system so as to reduce a deviation between the command phase θref and the rotational phase θ. By executing the vector control, it is possible to avoid an out-of-step state of the motor, an increase in motor noise caused by surplus torque, and an increase in consumption power. Further, by executing the phase feedback control, it is possible to control the rotational phase of the rotor to a predetermined phase.

Figure 12:
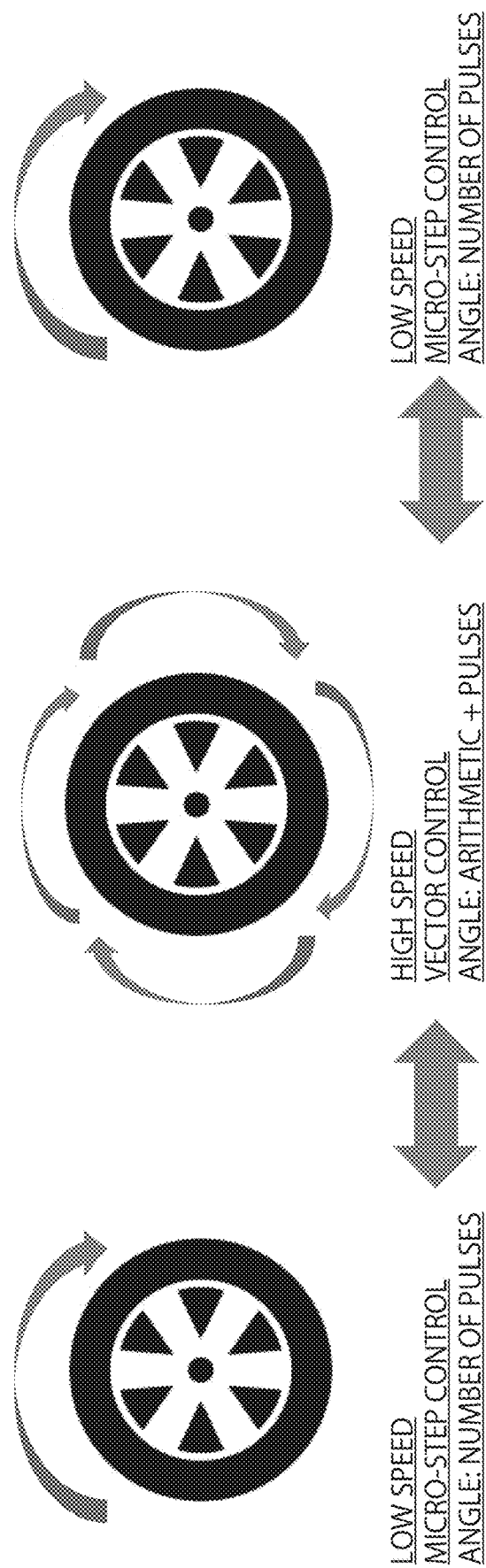
FIG. 12 is a diagram schematically illustrating an example of control by a main controller.

FIG. 12 is a diagram schematically illustrating an example of control by the main controller 208. The main controller 208 controls the excitation controller 204 to control the motor 10 by the micro-step control in the first control mode when the motor 10 rotates at a low speed. Therefore, it is possible to control a rotational angle of the motor 10 with high accuracy.

Next, when the motor 10 rotates at a speed equal to or higher than a predetermined rotational speed, the main controller 208 controls the vector controller 206 to control the motor 10 by the vector control in the second control mode. Therefore, it is possible to increase a rotational speed of the motor 10 while reducing a decrease in torque.

Next, when the motor 10 rotates at a speed lower than a predetermined rotational speed, the main controller 208 controls the excitation controller 204 to control the motor 10 by the micro-step control in the first control mode. Therefore, it is possible to control a rotational angle of the motor 10 with high accuracy. Further, the main controller 208 can execute the third control mode during a time period for which the control mode is switched between the first control mode and the second control mode. Therefore, it is possible to change the control mode while reducing vibration of the motor 10.

Figure 13:
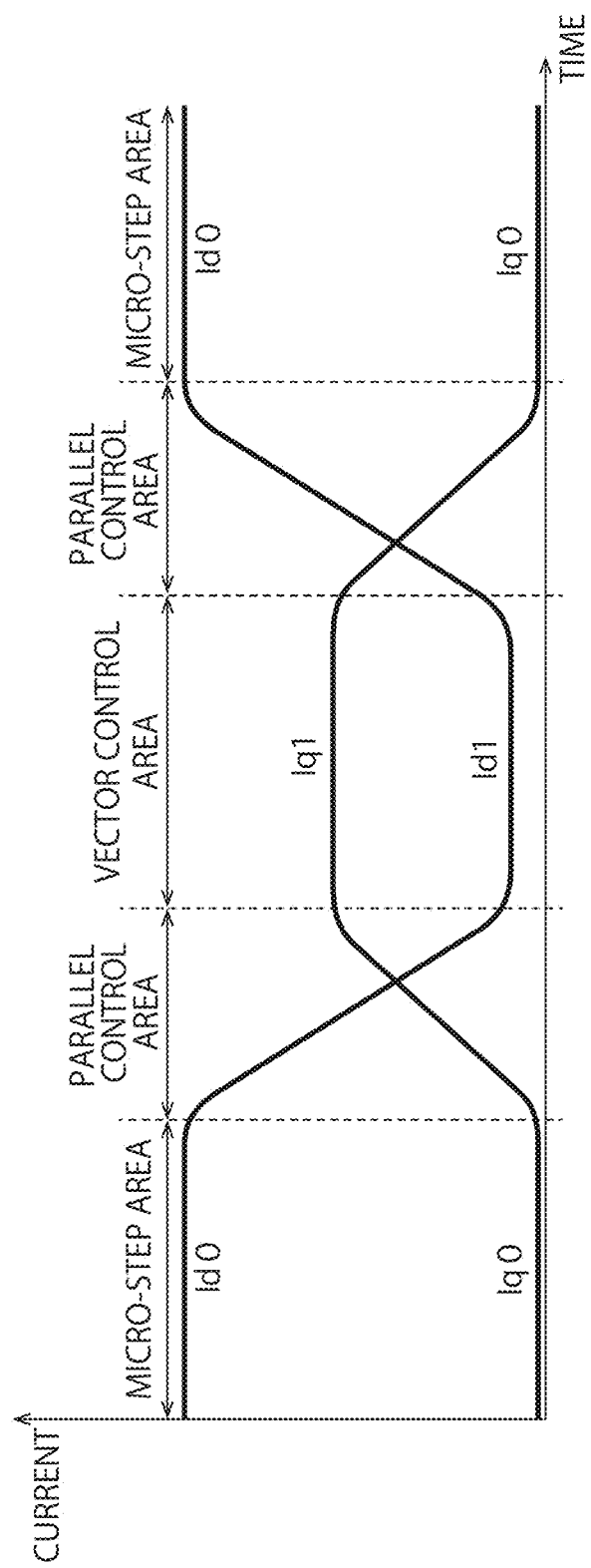
FIG. 13 is a diagram schematically illustrating switching of a control mode of the main controller.

FIG. 13 is a diagram schematically illustrating switching of the control mode of the main controller 208. The vertical axis indicates the current value Iq of the q-axis current and the current value Id of the d-axis current, and the horizontal axis indicates a time.

The main controller 208 controls the excitation controller 204 to reduce the current value Iq and reduce rotational torque in a micro-step area in the first control mode. The main controller 208 then starts parallel control of the vector controller 206 in the third control mode. Therefore, the micro-step control and the vector control are executed in parallel. Specifically, the main controller 208 controls the phase control circuit 300 of the vector controller 206 to generate and output a q-axis-current command value Iqref and a d-axis-current command value Idref as target values. That is, in the third control mode, the d-axis-current command value Idref is reduced from Id0 to Id1. When the d-axis-current command value Idref is smaller than the q-axis-current command value Iqref, the main controller 208 stops the micro-step control executed by the excitation controller 204 and shifts the control mode to the second control mode. Therefore, by reducing the current value Id that is the value of the field current, it is possible to reduce voltages induced by rotation of the rotor 102 and rotate the rotor 102 at a high rotational speed.

On the other hand, in order to shift from the second control mode to the first control mode, the main controller 208 controls the phase control circuit 300 of the vector controller 206 to increase the d-axis-current command value Idref from Id1 to Id0. The main controller 208 controls the phase control circuit 300 of the vector controller 206 to reduce the q-axis-current command value Iqref from Iq2 to Iq0. When the d-axis-current command value Idref is larger than the q-axis-current command value Iqref, the main controller 208 stops the vector control executed by the vector controller 206 and shifts the control mode to the first control mode.

As illustrated in FIG. 13, the main controller 208 generates the q-axis-current command value Idref and the d-axis-current command value Idref in such a manner that derivative values of the q-axis-current command value Idref and the d-axis-current command value Idref with respect to time during the shifting of the mode are continuous, and outputs the q-axis-current command value Idref and the d-axis-current command value Idref. Since derivative values of the q-axis-current command value Idref and the d-axis-current command value Idref with respect to time during the shifting of the control mode are continuous, it is possible to shift the control mode while reducing vibration of the motor 10. When derivative values of the q-axis-current command value Idref and the d-axis-current command value Idref with respect to time are not continuous, the derivative values may cause vibration of the motor 10.

Figure 14:
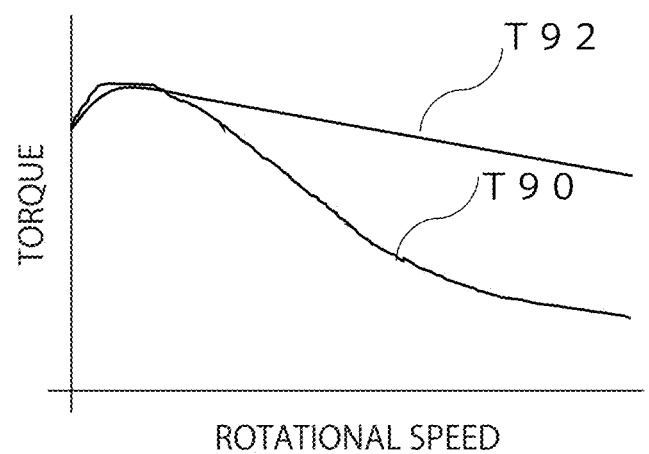
FIG. 14 is a diagram illustrating a curved line indicating a change in torque when the micro-step control and vector control are used.

FIG. 14 is a diagram illustrating a curved line T92 indicating a change in torque when the micro-step control and the vector control are used. The vertical axis indicates torque and the horizontal axis indicates a rotational speed. Similarly to FIG. 9A, curved line T90 indicates a change in torque that is caused by the micro-step control. By using the micro-step control and the vector control as illustrated in FIG. 14, it is possible to reduce a decrease in torque even when the rotational speed is in a high rotational speed range.

Figure 15:
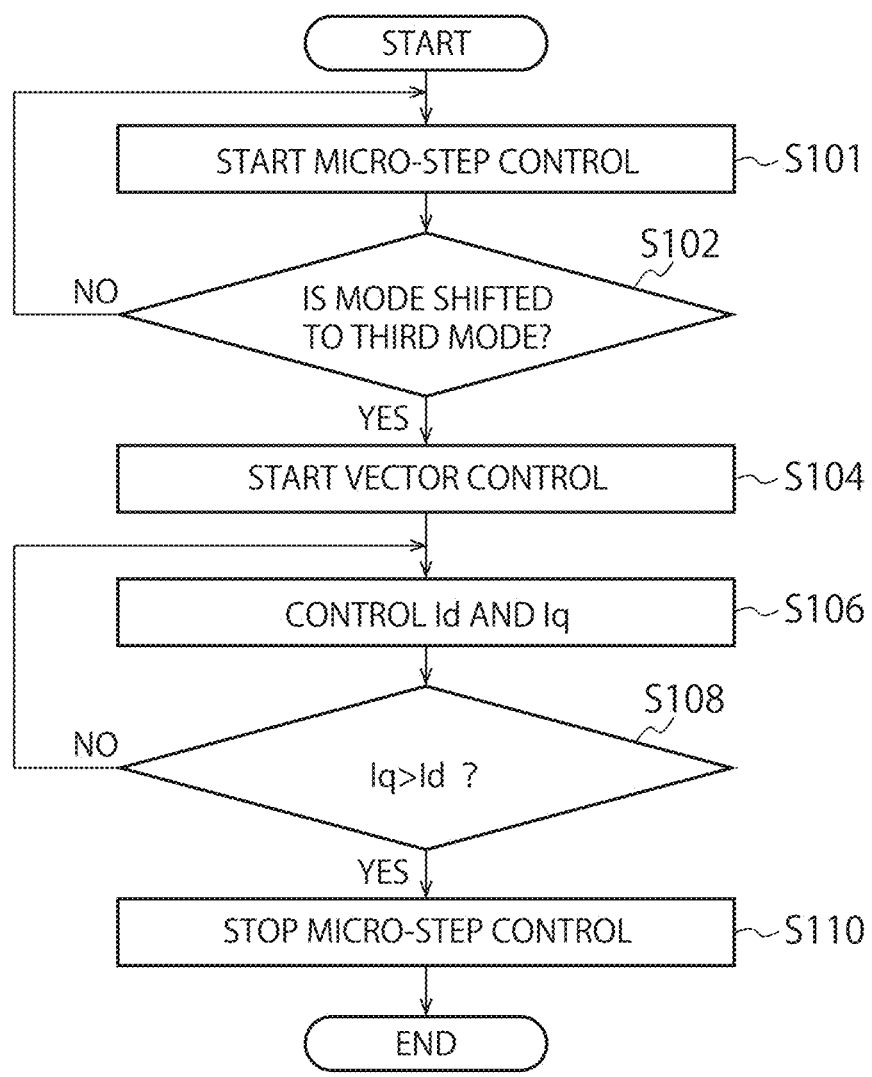
FIG. 15 is a flowchart illustrating an example of control by the main controller.

FIG. 15 is a flowchart illustrating an example of control by the main controller 208. An example of control to change the control mode from the first control mode to the second control mode is described below. As illustrated in FIG. 15, the main controller 208 controls the excitation controller 204 to start driving the motor 10 in the first control mode (Step S100).

Next, the main controller 208 determines whether a command to change the control mode is input from a higher-level system or whether the rotational speed exceeds a predetermined rotational speed (Step S102). When the main controller 208 determines that the change command is not input from the higher-level system and that the rotational speed does not exceed the predetermined rotational speed (NO at Step S102), the main controller 208 repeats the processes in order from Step S100.

On the other hand, when the main controller 208 determines that the change command is input from the higher-level system or that the rotational speed exceeds the predetermined rotational speed (YES at Step S102), the main controller 208 starts controlling the vector controller 206 and shifts the control mode to the third control mode (Step S104).

Next, the main controller 208 controls the phase control circuit 300 of the vector controller 206 to reduce the d-axis-current command value Idref from Id0 to Id1 and increase the q-axis-current command value Iqref from Iq0 to Iq1 (Step S106). The main controller 208 then determines whether the d-axis-current command value Idref is smaller than the q-axis-current command value Iqref (Step S108).

When the main controller 208 determines that the d-axis-current command value Idref is equal to or larger than the q-axis-current command value Iqref (NO at Step S108), the main controller 208 repeats the processes in order from Step S106. On the other hand, when the main controller 208 determines that the d-axis-current command value Idref is smaller than the q-axis-current command value Iqref (YES at Step S108), the main controller 208 stops the micro-step control executed by the excitation controller 204, shifts the control mode to the second control mode, and ends the shifting process (Step S110).

As described above, the motor drive system 1 according to the first embodiment can execute the micro-step control by the excitation controller 204 and the vector control by the vector controller 206 for the motor 10. Therefore, it is possible to control a rotational angle of the motor 10 by the micro-step control with high accuracy, reduce a decrease in torque of the motor 10 by the vector control, and rotate the motor 10 at a high rotational speed.

(Modification of First Embodiment)

The motor drive system 1 according to a modification of the first embodiment is different from the motor drive system 1 according to the first embodiment in that the motor drive system 1 according to the modification controls the phase control circuit 300 of the vector controller 206 to output a d-axis-current command value Idref and a d-axis-current command value Iqref as fixed values even during the micro-step control by the excitation controller 204. Differences between the motor drive system 1 according to the modification and the motor drive system 1 according to the first embodiment are described below.

The motor drive system 1 according to the modification of the first embodiment has a fourth control mode in which the vector controller 206 is driven even in the first control mode. In the fourth control mode, the main controller 208 causes the phase control circuit 300 to output absolute values of the d-axis-current command value Idref and the q-axis-current command value Iqref as fixed values. Therefore, a q-axis current Iq can be controlled to have a predetermined value even during the micro-step control. For example, the q-axis current Iq is controlled to 5% of a d-axis current Id.

Figure 16:
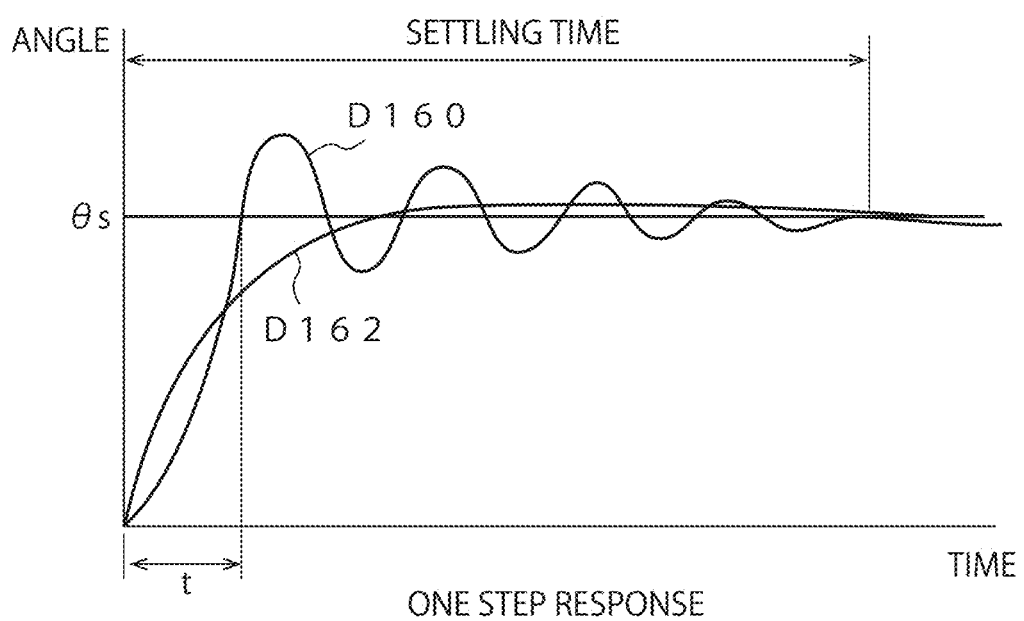
FIG. 16 is a diagram illustrating a rotational angle of a rotor at a first step in a fourth control mode.

FIG. 16 is a diagram illustrating a rotational angle of the rotor 102 of the motor 10 at a first step in the fourth control mode. The vertical axis indicates a rotational angle of the rotor 102 and the horizontal axis indicates a time. A rotational angle D160 indicates fluctuation of the rotational angle over time in the first control mode. A rotational angle D162 indicates fluctuation of the rotational angle over time in the fourth control mode. The rotational angle D160 in the first control mode reaches a target angle $\theta s$ at a time t. Thereafter, the rotational angle D160 repeatedly fluctuates around the target angle $\theta s$ for a settling time period and does not fluctuate after the settling time period.

On the other hand, fluctuation of the rotational angle D162 in the fourth control mode is reduced. In this manner, by maintaining the q-axis current Iq at a predetermined value during the micro-step control, vibration caused by rotation is reduced. It is considered that maintaining the q-axis current Iq at a predetermined value causes rotational torque in one direction to act and reduces vibration during the micro-step control.

As described above, the motor drive system 1 according to the modification of the first embodiment controls the phase control circuit 300 of the vector controller 206 to output the q-axis-current command value Iqref as a fixed value even during the micro-step control by the excitation controller 204. With this configuration, it is possible to reduce rotational vibration during the micro-step control.

While certain embodiments have been described, these embodiments have been presented by way of example only, and are not intended to limit the scope of the inventions. Indeed, the novel embodiments described herein may be embodied in a variety of other forms and various omissions, substitutions, and changes may be made without departing from the spirit of the inventions. The embodiments and their modifications are intended to be included in the scope and the spirit of the invention and also in the scope of the invention and their equivalents described in the claims.

The invention claimed is:

1. A motor control device comprising:
a first signal generator configured to generate, based on a clock signal indicating a stepping drive cycle of a motor, a first control signal including a polarity signal indicating a polarity of an excitation current that flows in the motor and a current amount signal indicating a current amount of the excitation current;
a second signal generator configured to generate, based on a command phase indicating a target phase of a rotor of the motor, a second control signal to control an excitation current that flows in the motor so as to reduce a deviation between a phase of the rotor and the target phase;
a main controller configured to control the first signal generator and the second signal generator to output at least one of the first control signal and the second control signal; and
a driver configured to drive the motor based on at least one of the first control signal and the second control signal, wherein
the main controller is configured to control the first signal generator and the second signal generator to control a magnitude of a q-axis current that generates a magnetic flux extending in a q-axis direction and rotating the rotor, and a magnitude of a d-axis current that generates a magnetic flux extending in a d-axis direction orthogonal to the q-axis direction, and
the main controller is configured to execute control to set the magnitude of the d-axis current to be larger than the magnitude of the q-axis current using the first control signal, and execute control to set the magnitude of the d-axis current to be smaller than the magnitude of the q-axis current using the second control signal.

2. The device of claim 1, wherein the main controller has a first control mode in which the first control signal is output to the driver and a second control mode in which the second control signal is output to the driver.

3. The device of claim 2, wherein the main controller is configured to cause the first signal generator to execute micro-step control to rotate the rotor by a predetermined angle based on the clock signal in the first control mode and cause the second signal generator to execute vector control in the second control mode.

4. The device of claim 3, wherein the main controller has a third control mode in which the first control signal and the second control signal are output to the driver.

5. The device of claim 4, wherein the main controller is configured to execute the third control mode during a predetermined time period for which the main controller switches between the first control mode and the second control mode.

6. The device of claim 5, wherein the main controller is configured to switch between the first control mode and the second control mode based on a rotational speed of the motor.

7. The device of claim 6, wherein the main controller is configured to, when the first control mode and the second control mode are switched, control the first signal generator and the second signal generator in such a manner that derivative values of the q-axis current and the d-axis current with respect to time are continuous.

8. The device of claim 7, wherein the main controller is configured to control the magnitude of the q-axis current to have a predetermined ratio to the magnitude of the d-axis current in the first control mode.

9. The device of claim 8, wherein
the second signal generator includes a current controller that controls the magnitude of the q-axis current, and
the magnitude of the q-axis current is controlled by the current controller in the first control mode.

10. A motor drive system comprising:
a motor; and
a motor control device configured to control the motor, wherein
the motor control device includes
a first signal generator configured to generate, based on a clock signal indicating a stepping drive cycle of the motor, a first control signal including a polarity signal indicating a polarity of an excitation current that flows in the motor and a current amount signal indicating a current amount of the excitation current,
a second signal generator configured to generate, based on a command phase indicating a target phase of a rotor of the motor, a second control signal to control an excitation current that flows in the motor so as to reduce a deviation between a phase of the rotor and the target phase,
a main controller configured to control the first signal generator and the second signal generator to output at least one of the first control signal and the second control signal, and
a driver configured to drive the motor based on at least one of the first control signal and the second control signal, wherein
the main controller is configured to control the first signal generator and the second signal generator to control a magnitude of a q-axis current that generates a magnetic flux extending in a q-axis direction and rotating the rotor, and a magnitude of a d-axis current that generates a magnetic flux extending in a d-axis direction orthogonal to the q-axis direction, and
the main controller is configured to execute control to set the magnitude of the d-axis current to be larger than the magnitude of the q-axis current using the first control signal, and execute control to set the magnitude of the d-axis current to be smaller than the magnitude of the q-axis current using the second control signal.

11. The system of claim 10, wherein the main controller has a first control mode in which the first control signal is output to the driver and a second control mode in which the second control signal is output to the driver.

12. The system of claim 11, wherein the main controller is configured to cause the first signal generator to execute micro-step control to rotate the rotor by a predetermined angle based on the clock signal in the first control mode and cause the second signal generator to execute vector control in the second control mode.

13. The system of claim 12, wherein the main controller has a third control mode in which the first control signal and the second control signal are output to the driver.

14. The system of claim 13, wherein the main controller is configured to execute the third control mode during a predetermined time period for which the main controller switches between the first control mode and the second control mode.

15. The system of claim 14, wherein the main controller is configured to switch between the first control mode and the second control mode based on a rotational speed of the motor.

16. The system of claim 15, wherein the main controller is configured to, when the first control mode and the second control mode are switched, control the first signal generator and the second signal generator in such a manner that derivative values of the q-axis current and the d-axis current with respect to time are continuous.

17. The system of claim 16, wherein the main controller is configured to control the magnitude of the q-axis current to have a predetermined ratio to the magnitude of the d-axis current in the first control mode.

18. A motor control method comprising:
generating, based on a clock signal indicating a stepping drive cycle of a motor, a first control signal including a polarity signal indicating a polarity of an excitation current that flows in the motor and a current amount signal indicating a current amount of the excitation current;
generating, based on a command phase indicating a target phase of a rotor of the motor, a second control signal to control an excitation current that flows in the motor so as to reduce a deviation between a phase of the rotor and the target phase;
executing control to output at least one of the first control signal and the second control signal; and
driving the motor based on at least one of the first control signal and the second control signal, wherein
executing includes controlling a magnitude of a q-axis current that generates a magnetic flux extending in a q-axis direction and rotating the rotor, and a magnitude of a d-axis current that generates a magnetic flux extending in a d-axis direction orthogonal to the q-axis direction, and
driving includes setting the magnitude of the d-axis current to be larger than the magnitude of the q-axis current using the first control signal, and setting the magnitude of the d-axis current to be smaller than the magnitude of the q-axis current using the second control signal.

* * * * *